(12) United States Patent
Volonterio et al.

(10) Patent No.: US 9,417,150 B2
(45) Date of Patent: Aug. 16, 2016

(54) PRESSURE TRANSMITTER FOR MEASURING THE PRESSURE OF A PROCESS FLUID AND RELATED METHOD

(75) Inventors: Eugenio Volonterio, Appiano Gentile (IT); Gabriele Crotti, San Fedele Intelvi (IT)

(73) Assignee: ABB Technology AG, Zurich (CH)

( * ) Notice: Subject to any disclaimer, the term of this patent is extended or adjusted under 35 U.S.C. 154(b) by 848 days.

(21) Appl. No.: 13/422,423

(22) Filed: Mar. 16, 2012

(65) Prior Publication Data

US 2012/0197553 A1     Aug. 2, 2012

Related U.S. Application Data

(63) Continuation of application No. PCT/EP2009/062636, filed on Sep. 29, 2009.

(51) Int. Cl.
| | |
|---|---|
| *G01L 7/00* | (2006.01) |
| *G01L 27/00* | (2006.01) |
| *G01L 7/08* | (2006.01) |
| *G01L 9/06* | (2006.01) |
| *G01L 9/12* | (2006.01) |
| *G01L 19/02* | (2006.01) |

(52) U.S. Cl.
CPC ............... *G01L 27/007* (2013.01); *G01L 7/08* (2013.01); *G01L 9/065* (2013.01); *G01L 9/125* (2013.01); *G01L 19/02* (2013.01)

(58) Field of Classification Search
CPC ................................ G01L 27/007; G01L 7/08
USPC .......................................................... 702/50
See application file for complete search history.

(56) References Cited

U.S. PATENT DOCUMENTS

| | | | | |
|---|---|---|---|---|
| 3,140,450 | A | | 7/1964 | Tavis |
| 3,723,987 | A | * | 3/1973 | Barone, Jr. .......... G01M 3/2807 340/527 |
| 3,778,726 | A | * | 12/1973 | Kucera .......................... 327/115 |
| 4,644,482 | A | * | 2/1987 | Juanarena ............... G01L 9/008 702/98 |
| 5,458,000 | A | * | 10/1995 | Burns .................. G01D 3/0365 73/497 |
| 5,798,462 | A | | 8/1998 | Briefer et al. |

FOREIGN PATENT DOCUMENTS

JP      62-080534 A      4/1987

OTHER PUBLICATIONS

*International Search Report (PCT/ISA/210) issued on Nov. 12, 2010, by European Patent Office as the International Searching Authority for International Application No. PCT/EP2009/062636.
*Written Opinion (PCT/ISA/237) issued on Nov. 12, 2010, by European Patent Office as the International Searching Authority for International Application No. PCT/EP2009/062636.

* cited by examiner

*Primary Examiner* — Hyun Park
(74) *Attorney, Agent, or Firm* — Taft Stettinius & Hollister LLP

(57) ABSTRACT

A pressure transmitter and method for measuring pressure exerted by a fluid on the diaphragm of the pressure transmitter. A pressure sensor assembly can include a diaphragm displaceable under pressure exerted by the fluid, and first and second electronic circuits generating first and second oscillating signals, respectively, whose frequencies depend on the displacement of the diaphragm. First and second numerical values which are representative of the oscillating frequencies of the first and second oscillating signals, respectively. A signal indicates pressure exerted by the fluid on the diaphragm based on the first and second calculated numerical values.

17 Claims, 5 Drawing Sheets

PRESSURE TRANSMITTER FOR MEASURING THE PRESSURE OF A PROCESS FLUID AND RELATED METHOD

RELATED APPLICATION

This application claims priority as a continuation application under 35 U.S.C. §120 to PCT/EP2009/062636, which was filed as an International Application on Sep. 29, 2009 designating the U.S., the entire content of which is hereby incorporated by reference in its entirety.

A pressure transmitter of the type used to monitor physical variables in industrial processes is disclosed, such as for measuring the pressure of a process fluid.

As known, pressure transmitters are devices widely utilized in industrial process control systems in order to detect/measure the pressure of a monitored process fluid. Such pressure transmitters can perform differential or absolute pressure measurements and therefore are manufactured according to different layouts and models. Known pressure transmitters include those indicated as gauge pressure transmitters, or absolute pressure transmitters, or differential pressure transmitters.

In many applications, the use of pressure transmitters can be advantageous since from one or more measurements of relative, differential or absolute pressure, it is possible to indirectly obtain values indicative of other physical variables of the fluid controlled, which values would be more difficult to be detected directly.

According to a known embodiment, a pressure transmitter comprises a main hollow body, sometimes indicated as the module housing or sensor housing body, which is suitably shaped to house components carrying out the transduction. For example, this main body includes a measurement chamber housing a pressure sensor. Suitable primary electric/electronic circuits for processing signals arriving from the pressure sensor may also be housed into the main hollow body.

Pressure sensors can be realized according to various technologies, for example there are inductive sensors, piezo-resistive sensors, capacitive sensors, etc.

A transmitter body is coupled to the sensor housing body and contains further components, such as for example displays for locally displaying values measured, secondary electronic circuits for processing the signals arriving from the pressure sensor and for communicating with other transmitters or with remote control units, etc.

In order to perform sensing and measurement operations and prevent damages of the sensor parts, the pressure transmitter can include a further part or body which is placed in contact with the process fluid. To this end this additional part is provided with one of more isolation diaphragms which are in fluid communication with the pressure sensor and are suitable to separate the process fluid from the circuit inside the transmitter. At least one of the isolation diaphragms is positioned on this additional part so as to have an external surface exposed directly to the process fluid under monitoring.

At the current state of the art, although pressure transmitters of known type adequately perform the tasks they are intended to execute, further improvements are desirable, for example as regards to the accuracy of measurements, capability of self-adaptation to the dynamics of the process fluid, and diagnostic in case of faulty operations of the pressure transmitter itself or parts thereof.

SUMMARY

A pressure transmitter is disclosed, comprising: a pressure sensor assembly having a diaphragm displaceable under pressure exerted by a fluid, a first electronic circuit for generating in output a first oscillating signal whose frequency depends on displacement of said diaphragm, a second electronic circuit for generating in output a second oscillating signal whose frequency depends on the displacement of said diaphragm, said first and second electronic circuits being positioned on opposite sides with respect to said diaphragm; first electronic means for calculating a first numerical value ($N_1$) and a second numerical value ($N_2$) which are representative of the oscillating frequency of said first oscillating signal and of the oscillating frequency of the second oscillating signals respectively; and second electronic means which generate a signal ($P_i$) indicative of pressure exerted by said fluid on the diaphragm based on said first and second numerical values ($N_1$, $N_2$).

A method is also disclosed for calculating pressure exerted by a fluid on a diaphragm of a pressure transmitter, said diaphragm being displaceable under action of said fluid, the method comprising: (a) generating first and second oscillating signals whose frequencies depend on displacement of said diaphragm; (b) calculating a first numerical value ($N_1$) and a second numerical value ($N_2$) which are representative of the oscillating frequencies of said first and second oscillating signals, respectively; and (c) generating a signal ($P_i$) indicative of pressure exerted by said fluid on the diaphragm based on said first and second calculated numerical values ($N_1$, $N_2$).

BRIEF DESCRIPTION OF THE DRAWINGS

Further characteristics and advantages of the invention will be more apparent from the description of preferred, but non-exclusive, embodiments of a pressure transmitter according to the invention, illustrated by way of non-limiting examples in the accompanying drawings, wherein.

DETAILED DESCRIPTION

An exemplary pressure transmitter is disclosed that includes a pressure sensor assembly having a diaphragm displaceable under the pressure exerted on it by a fluid, a first electronic circuit suitable for generating in output a first oscillating signal whose frequency depends on the displacement of said diaphragm, a second electronic circuit suitable for generating in output a second oscillating signal whose frequency depends on the displacement of said diaphragm, said first and second electronic circuits being positioned on opposite sides with respect to said diaphragm. First electronic means are provided for calculating a first numerical value and a second numerical value which are representative of the oscillating frequency of said first and second oscillating signals, respectively. Second electronic means can generate a signal indicative of the pressure exerted by said fluid on the diaphragm on the basis of said first and second calculated numerical values.

A method is also disclosed for calculating the pressure exerted by a fluid on a diaphragm of a pressure transmitter, wherein the diaphragm is displaceable under the action of the process fluid itself. The method can include generating first and second oscillating signals whose frequency depends on the displacement of the diaphragm; calculating a first numerical value and a second numerical value which are representative of the oscillating frequency of the first and second oscillating signals respectively; and generating a signal indicative of the pressure exerted by the fluid on the diaphragm on the basis of the first and second calculated numerical values.

In the following description, the pressure transmitter will be described by making particular reference to the use of an inductive sensor without intending in any way to limit its possible applications with different types of sensor, such as for instance piezo-resistive sensors, capacitive sensors, etc.

Figure 1:
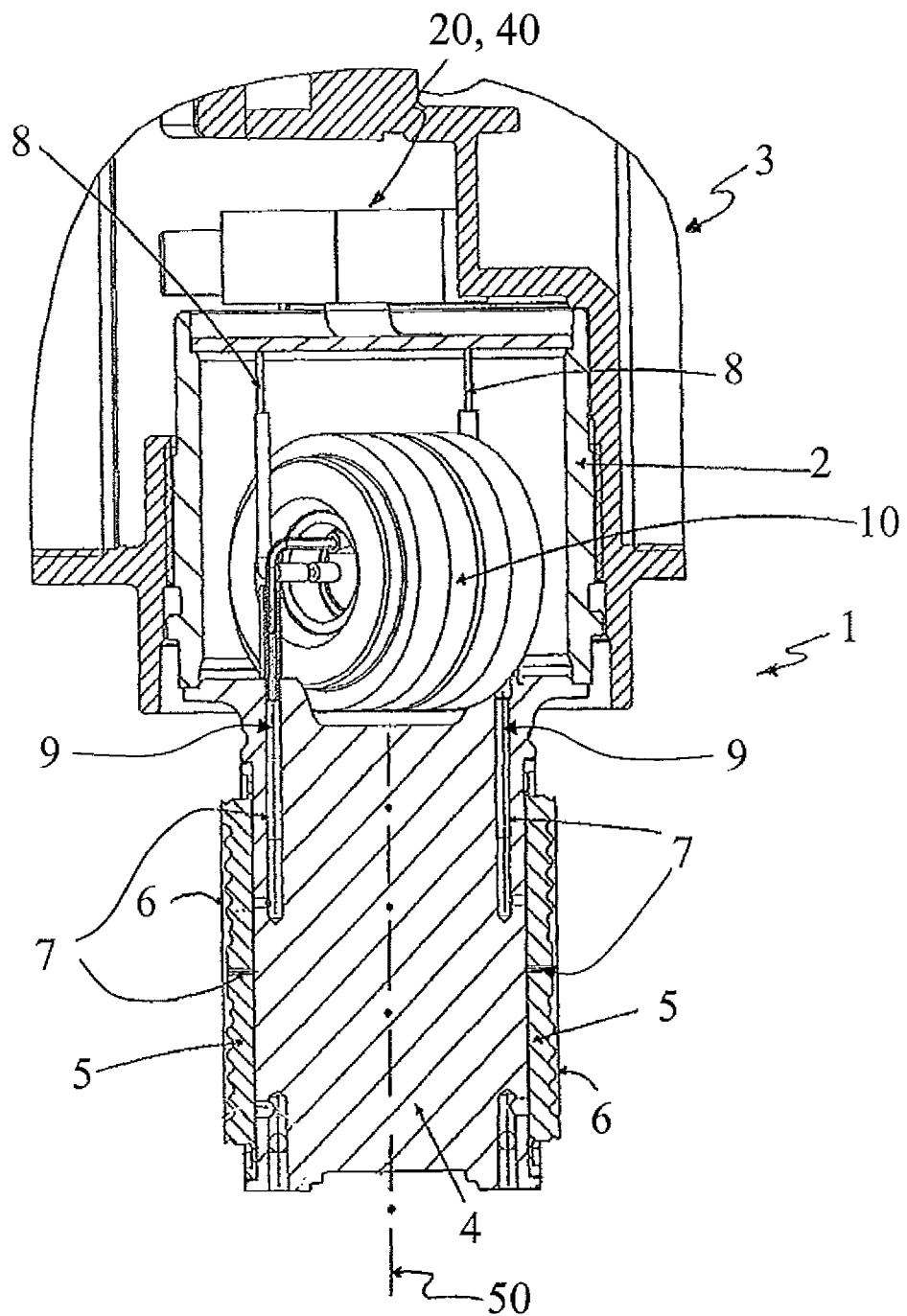
FIG. 1 is a partial view of a pressure transmitter with an inductive sensor according to a first exemplary embodiment of the present invention.

FIG. 1 illustrates an exemplary embodiment of a pressure transmitter as disclosed herein, globally indicated by reference number 1. For example, the pressure transmitter 1 includes a pressure sensor assembly having a hollow main body 2 for housing a pressure sensor 10; a transmitter body 3 which is suitably connected to the sensor assembly, and in particular to the hollow body 2. The transmitter body 3 houses suitable electronic means which receive input signals from the pressure sensor 10, via connection elements 8 (e.g. cables). The electronic means comprise first and second electronic means 20, 40 for outputting a measure of the pressure of a process fluid which is monitored by the pressure transmitter 1 itself.

In the example illustrated, the pressure transmitter 1 further includes a support body 4, which is connected to the hollow body 2 to support it, and an interface body 5 which is connected to the support body 4. At least a first isolation diaphragm 6 is positioned onto the interface body 5 so as to have its external surface suitable for interfacing with a process fluid the pressure of which has to be measured.

The isolation diaphragm 6 is in fluid communication with the pressure sensor 10, and for example with a displaceable diaphragm 11 of the sensor 10, via a hydraulic circuit 7 which is filled with a fluid 9, such as an incompressible fluid 9, such as silicon oil. The pressure exerted on the isolation diaphragm 6 by the process fluid is transferred (for example) unchanged to the pressure sensor 10 by the incompressible fluid 9 so that the various components of the pressure sensor 10 can be spaced apart from the process fluid which could damage them.

The structure of the pressure transmitter 1 is known to those skilled in the art and therefore will not be described herein in further details.

In the exemplary embodiment illustrated the pressure transmitter 1 includes a second isolation diaphragm 6 which is positioned on the interface body 5 and is also in fluid communication with the isolation diaphragm 11 by means of another hydraulic circuit 7; also this hydraulic circuit 7 is filled with the incompressible fluid 9. As illustrated in FIG. 1, the first and second isolation diaphragms 6 are fixed onto the interface body 5 opposite to each other with respect to the reference longitudinal axis 50 and extend substantially parallel to the axis 50 itself.

The diaphragm 11 of the pressure sensor 10 is displaceable under the pressure exerted on it (on both sides) by the pressure of the incompressible fluid 9 inside the two hydraulic circuits 7, each hydraulic circuit 7 being in communication with a corresponding isolation diaphragm 6.

As previously described, the pressure exerted by the incompressible fluid 9 has substantially (e.g., ±10%) the same value of the pressure exerted on the isolation diaphragm 6 by the process fluid under measurement. In this way the displacement of the diaphragm 11 depends on the value of the pressure exerted by the incompressible fluid 9 which in turn corresponds to the value of the process fluid whose pressure has to be measured. The incompressible fluid 9 exerts a first pressure $P_1$ on a first surface 43 of the diaphragm 11 and a second pressure $P_2$ on a second surface 44 opposite to the first surface 43.

A first electronic circuit 12 and a second electronic circuit 13 are positioned on opposite sides with respect to the diaphragm 11 and are suitable for generating in output a first oscillating signal 14 and a second oscillating signal 15, respectively, whose frequencies depend on the displacement of the diaphragm 11 and so they depend on the first and second pressures $P_1$, $P_2$, exerted on the surfaces 43, 44 of the diaphragm 11 by the incompressible fluid 9.

In particular the first and second electronic circuits 12, 13 include, for example, a circuit element having a parameter the value of which is changed by the displacement of the diaphragm 11, wherein the frequency of the oscillating signals depends on the value of said parameter.

Other pairs of electronic circuits like the first and second electronic circuits 12, 13 can be placed on opposite sides with respect to the diaphragm 11.

Figure 4:
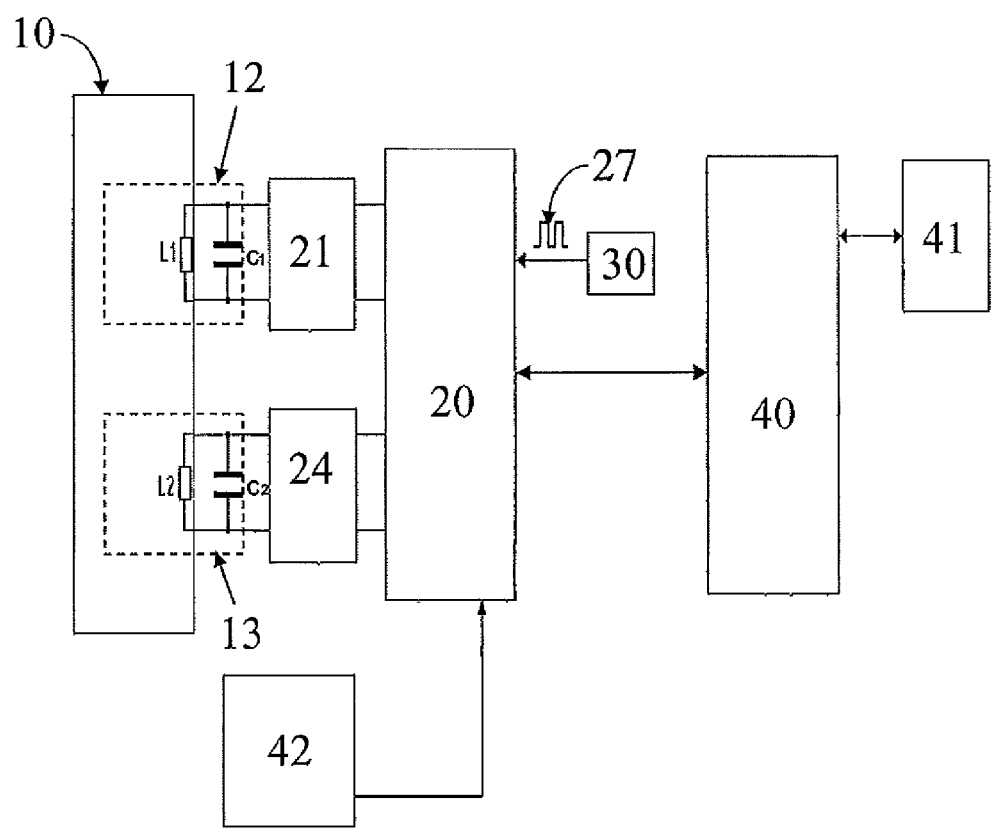
FIG. 4 is a block diagram of exemplary first and second electronic means used in the pressure transmitter of FIG. 1.

The electronic means of the pressure transmitter 1, according to an exemplary embodiment, include first electronic means 20 which receive in input the first and second oscillating signals 14, 15 and calculate a first numerical value $N_1$ and a second numerical value $N_2$ indicative of the oscillating frequency of the first and second oscillating signals 14, 15 respectively. The first electronic means 20 can be or include, an FPGA (Field Programmable Gate Array), as shown in FIG. 4, or other programmable electronic devices suitable for performing the calculation of the numerical values indicative of the oscillating frequencies.

Figure 2:
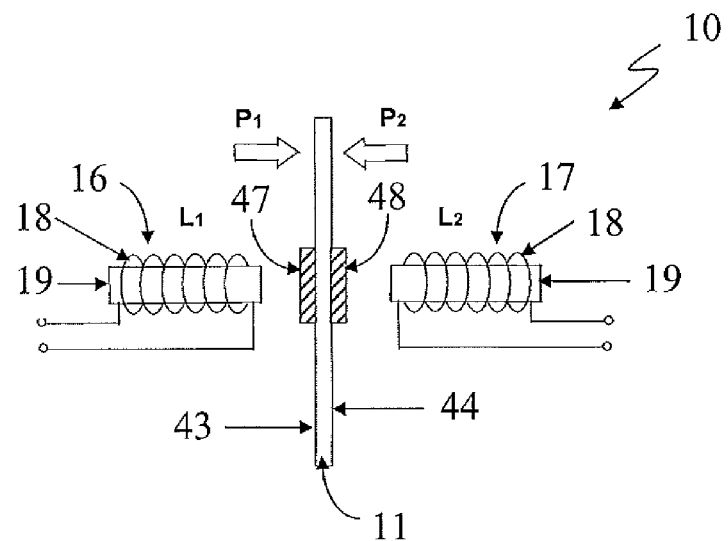
FIG. 2 is a schematic view of the inductive sensor shown in FIG. 1.

In FIG. 2 there is schematically shown a pressure sensor 10 of the inductive type which includes a first inductor 16 and a second inductor 17 which are positioned at the opposite sides with respect to the diaphragm 11; the inductors 16, 17 can be positioned at the same distance, as shown in FIG. 2, or at different distance with respect to the diaphragm 11.

The diaphragm 11 is for example made of metallic material and the first and second inductors 16, 17 include a suitable coil 18 wound around a core 19 made of magnetic material (e.g., a ferrite element). A first magnetic plate 47 and a second magnetic plate 48 are fixed onto the first and second surfaces 43, 44 of the diaphragm 11, respectively, in order to have a first magnetic circuit, having an inductive value $L_1$ set by the first inductor 16 and the first plate 47, and a second magnetic circuit, having an inductive value $L_2$ set by the second inductor 17 and the second plate 48. As illustrated, the two plates 47, 48 are placed on the diaphragm 11 in front of the two inductors 16, 17 and are spaced from them by air gaps of the first and second magnetic circuits.

The two magnetic plates 47, 48 can, for example, be made of a magnetic material (e.g. a ferrite element) that can be the same magnetic material of the core 19 of the first 16 and second 17 inductors, or a different magnetic material.

The displacement of the diaphragm 11 due to the pressure of the incompressible fluid 9 on the surfaces 43, 44 causes the movement of the first and second magnetic plates 47, 48 and therefore it modifies the air gap of the first and second magnetic circuits, causing the variation of the inductive values $L_1$, $L_2$ of the first and second magnetic circuits: one inductance value increases by a first certain quantity while the other decreases by a certain second quantity. The two quantities are substantially the same if the inductors 16, 17 are placed at the same distance with respect to the diaphragm 11.

Figure 3:
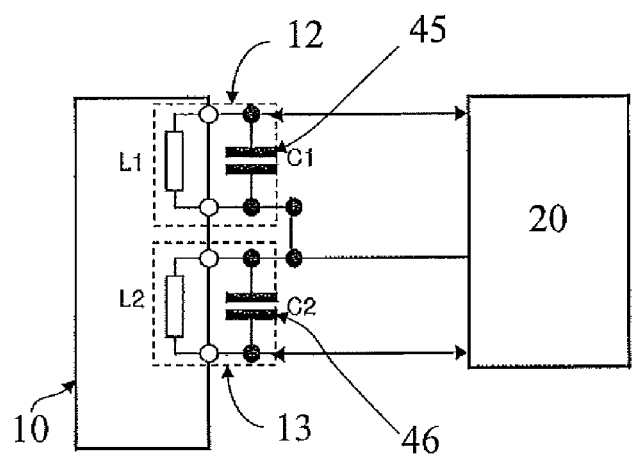
FIG. 3 shows an equivalent circuit of two oscillating circuits of the inductive sensor of FIG. 2.

A first capacitor 45 and a second capacitor 46, with capacitance values $C_1$ and $C_2$, respectively, are placed electrically in parallel to the first and second inductors 16, 17 respectively, creating a first LC oscillating circuit 12 and a second LC oscillating circuit 13 which are shown in FIG. 3. The stiffness of the diaphragm 11 determines the URL (Upper range limit) of the inductive sensor 10.

According to an exemplary embodiment of the two LC oscillating circuits 12, 13, the first and second inductors 16, 17 and the first and second magnetic plates 47, 48 are designed in order to have substantially the same value for the inductances $L_1$, $L_2$ and also the first and second capacitors 45, 46, are designed in order to have substantially the same capacitance value $C_1$, $C_2$. Alternatively the first and second inductors 16, 17 and the first and second magnetic plates 47, 48 can be designed in order to have a different value for the inductances $L_1$, $L_2$ and also the first and second capacitors 45, 46 can be designed in order to have different capacitance values $C_1$, $C_2$.

The pressure measurement starts when the first and second LC oscillating circuits 12, 13 are excited by first and second predefined series of pulses respectively in order to generate in output a first and a second oscillating signal 14, 15; the first and second series of pulses are generated in parallel by two different RC networks 21, 24 driven by the first electronic means 20 and for example are applied to the first and second LC oscillating circuits 12, 13 in parallel and substantially at the same time. The temporal width of each pulse can be set in order to be short enough to not disturb the measurement, for example the temporal width can be equal to a quarter of the period of oscillation of the oscillating signals 14, 15.

Advantageously the first electronic means 20 can include an internal watchdog block for checking the presence in input of the first and second oscillating signals 14, 15: if the two oscillating signals have not been generated, the first electronic means 20 send a reset signal so as to close a first and second discharge switches associated to the first and second LC oscillating circuits 12, 13, respectively. When the two discharge switches are closed by the reset signal, the first and second LC oscillating circuits 12, 13 discharge and restart to generate in output the first and second oscillating signals 14, 15.

Figure 5:
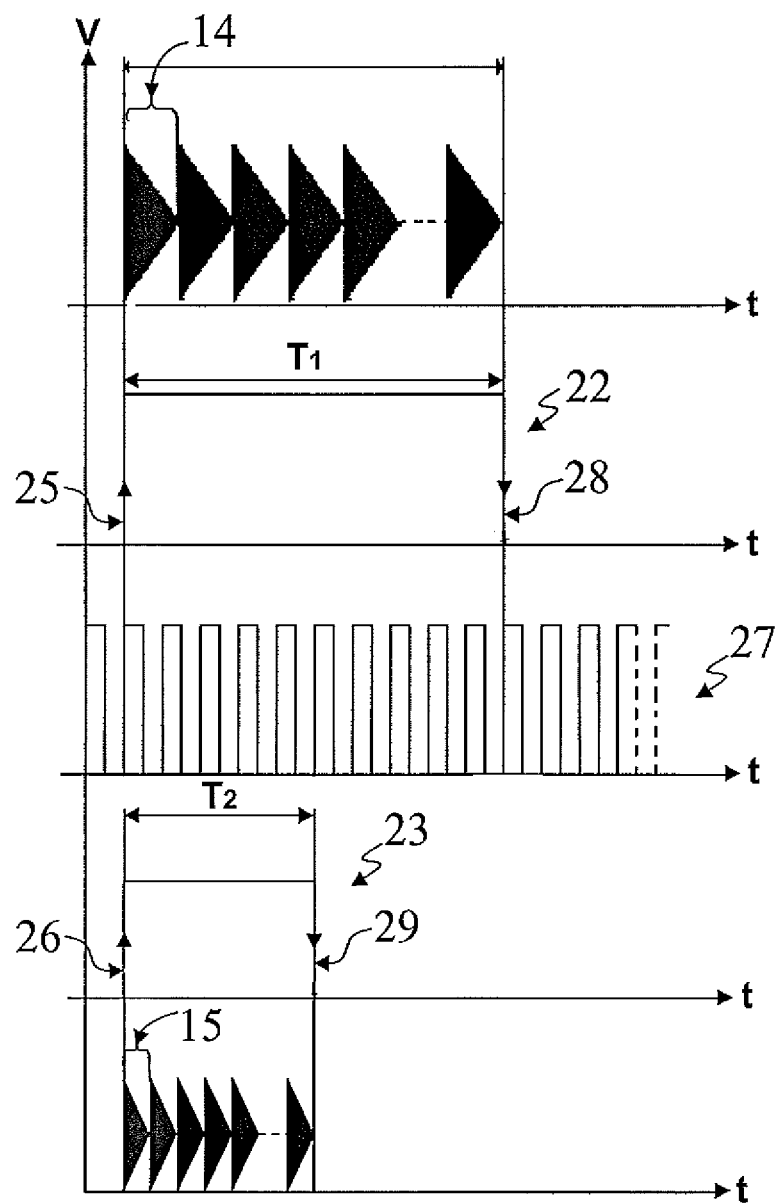
FIG. 5 shows an exemplary electrical signal generated and output by the oscillating circuits, the pulse width signals generated via a first electronic means.

When the first LC oscillating circuit 12 has been excited by the first pulse of the first series of pulses, it generates in output the first oscillating signal 14 which presents oscillations whose amplitudes decrease while time increases, as shown in FIG. 5; the first oscillating signal 14 has a period of oscillation $T_{osc}$ that is a function of the first inductance value $L_1$, according to the following relation:

$$T_{OSC} = 2\pi\sqrt{L_1 C_1}.$$

As previously described, the first inductance value $L_1$ changes of a certain quantity according to the displacement of the diaphragm 11 while the capacitance value $C_1$ remains constant, so that the frequency of the first oscillating signal 14 is a function of the pressure exerted by the incompressible fluid 9 (corresponding to the process fluid pressure which has to be measured). The first oscillating signal 14 is squared off for being transmitted to the first electronic means 20 which starts to count the number of oscillations of the signal, using for example a first comparator. When a predefined number of oscillations $X_n$ is counted, the first electronic means 20 command the first RC network 21 to generate a second excitation pulse of the first series of pulses. A new subsequent regenerated first oscillating signals 14 is generated in output by the first LC oscillating circuit 12, as shown in FIG. 5, and the first electronic means 20 perform on it the same operations described for the preceding first oscillating signal 14 generated by the first excitation pulse. At the end of the measurement, the first series of pulses has been constituted by a predefined number $I_n$ of excitation pulses. The duration time $T_1$ of the measurement performed with the first LC oscillating circuit 12 can be calculated by multiplying the oscillating period $T_{osc}$ of the first oscillating signal 14 and a constant value equal to $(X_n) \cdot (I_n)$, so that it is a function of the first inductance value $L_1$ and it is indicative of the displacement of the diaphragm 11. For example, the number $X_n$ can be set equal to 16 while the number $I_n$ can be set equal to 20 or 70, having resulting time durations $T_1$ of the measurement of about 10 ms and 30 ms, respectively.

The series of consecutive first oscillating signals 14 which is generated by the first series of pulses is converted by the first electronic means 20 into a first signal 22 having a time duration $T_1$ which corresponds to the time duration $T_1$ of the measurement. A second comparator in the first electronic means 20 can, for example, receive in input the consecutive first oscillating signals 14 and generates in output a first pulse width signal 22, shown in FIG. 5; the width of the signal 22 corresponds to the time duration $T_1$ of the measurement and depends on the oscillating frequency of the first LC oscillating circuit 12.

The above described generation of the first signal 22 with a time duration $T_1$ applies likewise for generating a second signal 23 having a time duration $T_2$ indicative of the oscillating frequency of the second LC oscillating circuit 13: a second series of pulses generated by the second RC network 24 has a predefined number $I_n$ of excitation pulses and excites the second LC oscillating circuit 13 which generates in output a corresponding series of consecutive second oscillating signals 15, each of which presents a predefined number $X_n$ of oscillations counted in the first electronic means 20, for example by a third comparator.

A duration time $T_2$ of the measurement performed with the second LC oscillating circuit 13 can be calculated by multiplying the oscillating period $T_{osc}$ of the second oscillating signal 15 and a constant value $(X_n) \cdot (I_n)$, so that it is a function of the second inductance value $L_2$ and it is indicative of the displacement of the diaphragm 11. For example, a fourth comparator inside the first electronic means 20 can be provided to convert the series of consecutive second oscillating signals 15 into a second pulse width signal 23 the width of which corresponds to the duration time $T_2$ of the measurement and depends on the oscillating frequency of the second LC oscillating circuit 13.

As previously described, the excitation pulses generated by the first and second RC networks 21, 24 excite the first and second LC oscillating circuits 12, 13 in parallel and substantially at the same time; the first and second oscillating signals 14, 15 generated in output are processed in parallel, inside the first electronic means 20, so that the rising edge 25 of the first pulse width signals 22 and the rising edge 26 of the second pulse width signal 23 occur at the same time. For example, at the rising edges 25, 26 a first counter and a second counter of the first electronic means 20 start to count the pulses of a clock signal 27, shown in FIG. 5: at the falling edge 28 of the first pulse width signal 22 the first counter stops while the second counter stops at the falling edge 29 of the second pulse width signal 23.

Therefore, the two counters calculate a first numerical value indicative of the oscillating frequency of the first LC oscillating circuit 12 and a second numerical value indicative of the oscillating frequency of the second LC oscillating circuit 13. A digital conversion of the frequency of analogical signals is so performed, without using analogical to digital converters.

At the falling edge 28, 29 of the slowest of the two pulse width signals 22, 23 the digital conversion is ended and the two LC oscillating circuits are discharged, for example by discharge switches, so that the pressure transmitter 1 is ready for new subsequent measurements based on new oscillating signals 14, 15 generated in output by the first and second electronic circuits 12, 13.

By using two different counters to calculate the numerical values indicative of the oscillating frequencies, the two measurements based on the first and second oscillating signals 14, 15 are completely performed in parallel inside the first electronic means 20 so that the first and second numerical values are calculated substantially at the same time.

For example, an oscillator circuit 30 can be included to provide a precisely and stable clock signal 27 to the first electronic means 20 which is used in the calculation of the numerical values; an example of clock frequency can be 14 MHz.

The described calculating of numerical values indicative of a frequency of oscillating signals 14, 15, wherein the frequency depends on the pressure exerted by the fluid, is applicable also to pressure transmitters 1 having piezo-resistive or capacitive pressure sensors.

For example, in an embodiment of a transmitter 1 with a capacitive sensor, the diaphragm 11 can be made of ceramic material and its displacement under the pressure of the incompressible fluid 9 causes the variation of the capacitance values of a first capacitor and a second capacitor placed at opposite sides with respect to the diaphragm 11. The first and second capacitors are included in a first and a second electronic circuit, respectively, which are suitable for generating a first oscillating signal and a second oscillating signal. Considering for simplicity only the first circuit, the first capacitor can be electrically connected to a first input node of a comparator, the voltage of which is modulated by the variation of the capacitance value due to the displacement of the diaphragm 11. At the second input node of the comparator is provided a saw-tooth tooth signal whose parameters do not vary in time. The signal output of the comparator will be a pulse width signal with a frequency which depends on the displacement of the diaphragm 11. The pulse width signal is transmitted to the first electronic means of the pressure transmitter 1 and a counter counts clock pulses during the temporal width of the oscillating signal.

If the pressure transmitter 1 uses a piezo-resistive sensor, the first input node of the comparator is connected to the output of an electronic circuit, for example a Wheatstone bridge, which comprises the piezo-resistive sensor. The piezo-resistive sensor, made for example of silicon, changes its electric resistance under the pressure of the incompressible fluid 9 so as to modulate the output of the electronic circuit and the voltage of the first input of the comparator. A saw-tooth signal whose parameters do not vary in time is provided at the second node of the comparator in order to output a pulse width signal having a frequency which depends on the incompressible fluid pressure. The pulse width signal is calculated by the first electronic means.

Regardless of the type of sensor used, the first and second numerical values calculated by the first electronic means 20 are transmitted to second electronic means 40 which are in communication with or comprise storage means 41 suitable for storing the numerical values calculated. For example, the second electronic means 40 can include a microprocessor 40 while the storage means 41 can be a non-volatile memory, such as for example an EEPROM memory 41.

The second electronic means 40 can generate a signal $P_i$ indicative of the pressure exerted by the incompressible fluid 9 on the diaphragm 11, wherein the signal is generated on the basis of the first and second numerical values which are indicative of the pressure $P_1$ and $P_2$ exerted on the first and second surfaces 43, 44 of the diaphragm 11, respectively. For example, the signal indicative of the pressure exerted by the incompressible fluid 9 can be generated simply by performing the difference between the first and second stored numerical values.

By using two numerical values carrying out the same information about the pressure to be measured, the accuracy of the measurement is increased.

Advantageously, the second electronic means 40 according to an exemplary embodiment can be devised to perform diagnostic operations in order to check the occurrence of fault conditions of the pressure transmitter 1, or any part thereof. The first and second numerical values are indicative of the pressures $P_1$, $P_2$ exerted on the first and second surfaces 43, 44 of the diaphragm 11, respectively. For example, the second electronic means 40 can calculate the difference between the first and second numerical values indicative of the pressures $P_1$ and $P_2$ and if this difference exceeds a predefined first threshold they generate an alarm signal indicative of a fault condition of the pressure transmitter 1, or any part thereof. For example, when the difference exceeds the predefined first threshold, an error message is generated by the second electronic means 40 and then the same error message is used to generate the alarm signal.

In an exemplary embodiment, before generating the alarm signal, the second electronic means 40 can send to the first electronic means 20 a reset signal for a predefined number of times in order to repeat calculations. When the first electronic means 20 receive the reset signals, they reset and restart the measurement; if, after the measurements executed for a predetermined number of reset attempts, the difference between the first and second numerical values remains above the first threshold, a fault alarm signal is generated by the second electronic means 40 because the failure of the measurement is not due to the first electronic means 20 operations but is due to a faulty operation of the pressure transmitter 1.

For example, the second electronic means 40 can also perform a self-adaptation of the pressure transmitter 1 to the dynamic of the process fluid. For example, a first signal indicative of the pressure exerted by the incompressible fluid 9 on the diaphragm 11 is calculated by the second electronic means 40 during a first measurement, and a second signal indicative of the pressure exerted by the incompressible fluid 9 on the diaphragm 11 is calculated by the second electronic means 40 during a second measurement following immediately after the first measurement.

If the difference between two consecutive signals indicative of the pressure exceeds a second predefined threshold, it is meant that the dynamic (e.g., variations of the fluid pressure) of the process fluid is varying too fast with respect to the duration time $T_1$, $T_2$ of each measurements, so that the pressure value exerted by the incompressible fluid 9 on the diaphragm 11 might not be correctly calculated. An example of a process fluid with a fast dynamic, and so with a fast variation of pressure, occurs when a process fluid is compressed by a big industrial compressor.

When the difference of the two consecutive signals indicative of the pressure exerted by the fluid exceeds the second predefined threshold, the second electronic means 40 generate a command signal in input to the first electronic means 20 so as the duration time $T_1$, $T_2$ of the measurements is reduced. For example, the first electronic means 20 can reduce the duration time $T_1$, $T_2$ of the measurements by reducing the predefined number $I_n$ of excitation pulses applied to the first and second electronic circuits 12, 13 and/or by reducing the predefined counted number $X_n$ of oscillations of the first and second oscillating signals 14, 15 generated in output by the first and second electronic circuits 12, 13 respectively.

In practice in this way the time intervals needed to calculate each numerical value representative of the oscillating frequency of the two oscillating signals is reduced, thus ultimately reducing the time needed to have signals indicative of the pressure exerted by the process fluid.

On the contrary, if the difference between the first and second consecutive signals indicative of the pressure exerted by incompressible fluid 9 does not exceed the second predefined threshold, it is meant that the dynamic of the process fluid is slow and stable; in such a case it is possible to increase the duration time $T_1$, $T_2$ of the measurements in order to have a better resolution of the measurements. In this way, very low variations of fluid pressures can be detected and measured. According to the applications, the values of the threshold for detecting a fast dynamic of the process fluid and of the threshold for detecting a slow dynamic of the process fluid can be equal or different to each other.

In practice, when the difference of two consecutive signals indicative of the incompressible fluid 9 pressure does not exceed the second predefined threshold the second electronic means 40 generate a command signal in input to the first electronic means 20 so as the duration time $T_1$, $T_2$ of the measurements is increased. For example, the first electronic means 20 can increase the duration time $T_1$, $T_2$ of the measurements by increasing the predefined number $I_n$ of excitation pulses applied to the first and second electronic circuits 12, 13 and/or by increasing the predefined counted number $X_n$ of oscillations of the first and second oscillating signals 14, 15 generated in output by the first and second electronic circuits 12, 13 respectively.

Hence, in this case the time intervals used to calculate each numerical value representative of the oscillating frequency of the two oscillating signals is extended, thus ultimately extending the time needed to have signals indicative of the pressure exerted by the process fluid.

Alternatively, in case of a slow or very stable dynamics it is possible to calculate the difference between two non-consecutive signals.

Advantageously, a temperature sensor 42 can be associated to the pressure transmitter 1; this sensor 42 measures the environmental temperature and transmits the measured data to the first electronic means 20. For example, the first electronic means 20 can comprise a look-up table, or other suitable registers, which store a series of corrective coefficients one of which is selected based on the value of the temperature measured. This corrective coefficient is applied to the first and second numerical values indicative of the displacement of the diaphragm 11. In this way, the first electronic means 20 corrects possible errors in the measurements due to the effect of the environmental temperature of the pressure transmitter 1.

The second electronic means 40 can further perform a static pressure compensation in order to reduce the error introduced in the pressure measurement, especially in the differential pressure measurements. The information about the static pressure value of the process fluid is obtained on the basis of the first and second numerical values which are indicative of the displacement of the diaphragm 11 in the pressure sensor 10. The estimated value of the static pressure is then used to correct the calculation of the signal indicative of the pressure exerted on the diaphragm 11, for example by applying a corrective coefficient to the values of the pressure measured.

Figure 6:
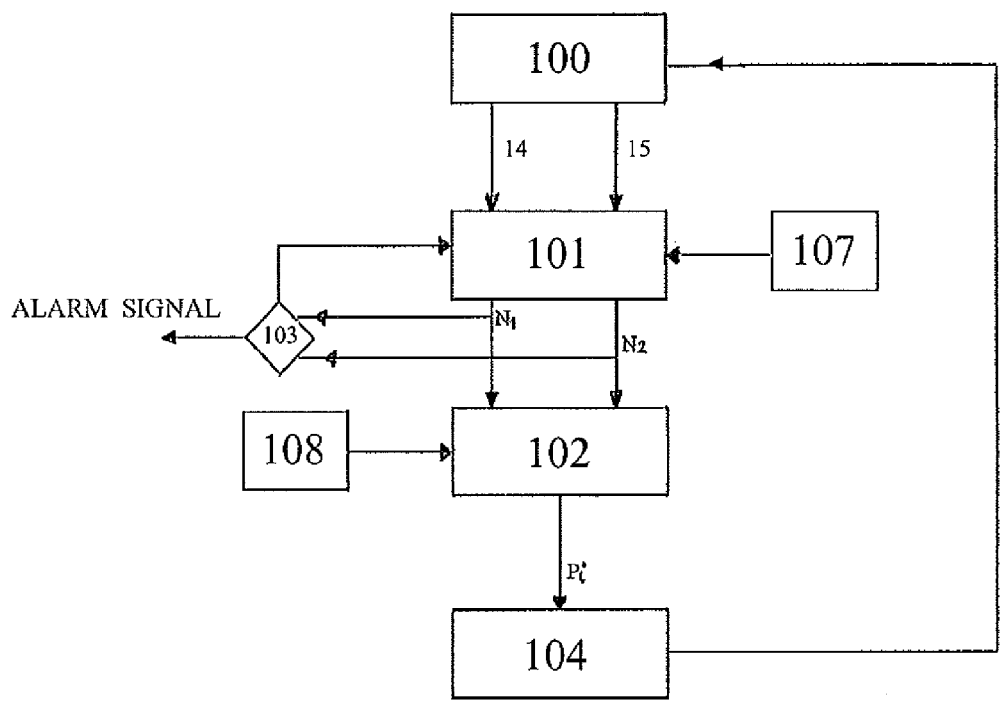
FIG. 6 is a block diagram illustrating an exemplary method for calculating pressure exerted by a fluid on a diaphragm of a pressure transmitter.

A method (see FIG. 6) is also disclosed for calculating the pressure exerted by a fluid on the diaphragm 11 displaceable under the action of the fluid itself.

An exemplary method can include the following:

generating (100) first and second oscillating signals 14, 15 whose frequency depends on the displacement of the diaphragm 11, wherein the signals 14, 15 are generated in output by a first and second electronic circuits 12, 13 respectively;

calculating (101) a first numerical value and a second numerical value which are representative of the oscillating frequency of the first and second oscillating signals 14, 15 respectively;

generating (102) a signal indicative of the pressure exerted by the fluid on the diaphragm 11 on the basis of the first and second calculated numerical values.

Advantageously, the first and second numerical values can be calculated substantially at the same time.

For example, the step (101) of the exemplary method can include:

calculating a first signal 22 and a second signal 23 having a time duration $T_1, T_2$ whose counted values are indicative of the oscillating frequency of the first and second oscillating signals 14, 15, respectively.

The method can also include:

comparing (103) the first and second numerical values and, if the difference between these numerical values exceeds a first predefined threshold, generating an alarm signal indicative of a fault condition of the pressure transmitter 1 or parts thereof.

The step (103) can, for example, include resetting the calculation of the first and second numerical values for a predefined number of times before generating the alarm signal indicative of a fault condition of the pressure transmitter 1 or parts thereof.

Advantageously, an exemplary method can comprise step:

calculating (104) the difference between two consecutive signals indicative of the pressure exerted by the fluid on the diaphragm 11 and, if the difference exceeds a predefined second threshold, generating a command signal so as to reduce the time interval during which each numerical value representative of the oscillating frequency of the oscillating signals is calculated.

If instead at step (104) the difference between two consecutive signals indicative of the pressure exerted by the fluid on the diaphragm 11 does not exceed a predefined second threshold, the method can include generating a command signal so as to extend the time interval during which each numerical value representative of the oscillating signals is calculated.

An exemplary method can include:

measuring (107) the environmental temperature external to the pressure transmitter 1 and using the measured temperature value to perform a temperature compensation in order to reduce the error in the calculation of the first and second numerical values. For example, as previously described, the first electronic means 20 apply a corrective coefficient to the numerical values calculated, which coefficient depends on the value of the temperature measured.

The method can also include:

calculating (108) the static pressure of the fluid and using the calculated static pressure value to perform a static compensation in order to reduce the error in the calculation of the first and second numerical values. For example, in this case the second electronic means 40 can apply a corrective coefficient to the signals indicative of the pressure exerted by the fluid on the diaphragm.

In practice, it has been seen how an exemplary pressure transmitter 1 and related method can improve over known solutions. For example, since measurement of the pressure exerted by the process fluid can be executed by carrying out a digital conversion of the frequency of the analogical oscillating signals 14, 15, such measurements can be independent from amplitudes of the oscillating signals 14, 15 and hence, the pressure values calculated can be exempted from errors due to the influence of temperature on the electronic parts of the pressure transmitter 1.

In addition, because measurements can be performed in parallel and at the same time on two separated branches, the accuracy of the values measured can be enhanced.

Self-diagnostic of the pressure transmitter 1 and self-adaptation to the dynamic of the process fluid under control, can offer further improvements of the pressure transmitter 1 over known transmitters.

Moreover, all parts/components can be replaced with other technically equivalent elements; in practice, the type of materials, and the dimensions, can be according to any desired specification, and/or to the state of the art. For example the first electronic means 20 and the electronic networks 21, 24 for generating the excitation pulses can be embodied into a single electronic block; the pressure transmitter 1 can be construed differently with respect to the exemplary embodiment illustrated in FIG. 1, etc.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A pressure transmitter, comprising:
    a pressure sensor assembly having a diaphragm displaceable under pressure exerted by a fluid, a first LC oscillating circuit and a second LC oscillating circuit positioned on opposite sides with respect to said diaphragm, in which each inductance varies as a function of the displacement of said diaphragm while each capacity is constant, wherein said first LC oscillating circuit is excited by a first predefined series of pulses to generate an output of a series of consecutive first oscillating signals, wherein said second LC oscillating circuit is excited by a second predefined series of pulses to generate an output of a series of consecutive second oscillating signals, the oscillating frequency of said consecutive first oscillating signals and of said consecutive second oscillating signals depending on the displacement of said diaphragm, and wherein said first predefined series of pulses and said second predefined series of pulses are generated by a first electronic network and a second electronic network, respectively;
    first electronic means for calculating a first numerical value which is representative of the oscillating frequency of said consecutive first oscillating signals, and a second numerical value which is representative of the oscillating frequency of said consecutive second oscillating signals, said first electronic means driving said first and second electronic networks; and
    second electronic means which generate a signal indicative of pressure exerted by said fluid on the diaphragm based on said first and second numerical values,
    wherein said second electronic means is configured to calculate a difference between two consecutive signals indicative of the pressure exerted by said fluid on the diaphragm and, whenever said difference exceeds a predefined second threshold, send a command signal as an input to said first electronic means so as to reduce the time interval during which each numerical value representative of the oscillating frequency of said consecutive first oscillating signals and of said consecutive second oscillating signals is calculated.

2. The pressure transmitter according to claim 1, wherein said second electronic means are configured to generate an alarm signal indicative of a fault condition of the pressure transmitter wherein a difference between said first numerical value and said second numerical value exceeds a first predefined threshold.

3. The pressure transmitter according to claim 2, wherein said first electronic means are configured to be reset by said second electronic means for a predefined number of times before said second electronic means generate said alarm signal.

4. The pressure transmitter according to claim 1, wherein said first electronic means is configured to calculate said first and second numerical values substantially at the same time.

5. The pressure transmitter according to claim 1, wherein whenever said difference does not exceed the predefined second threshold, send a command signal as an input to said first electronic means so as to extend the time interval during which each numerical value representative of the oscillating frequency of said consecutive first oscillating signals and of said consecutive second oscillating signals is calculated.

6. The pressure transmitter according to claim 1, wherein said first LC oscillating circuit and said second LC oscillating circuit are excited substantially at the same time by said first predefined series of pulses and by said second predefined series of pulses, respectively.

7. The pressure transmitter according to claim 1, wherein said first electronic means calculates a first signal and a second signal having a time duration whose counted values are indicative of the oscillating frequencies of said first LC oscillating circuit and said second LC oscillating circuit, respectively.

8. The pressure transmitter according to claim 1, wherein said first electronic means apply to said first and second numerical values a corrective coefficient selected based on the environmental temperature external to said pressure transmitter measured by a temperature sensor.

9. The pressure transmitter according to claim 1, wherein said second electronic means is configured for calculating a static pressure of the fluid to perform a static compensation in order to reduce the error in the pressure measurements.

10. A method for calculating pressure exerted by a fluid on a diaphragm of a pressure transmitter, said diaphragm being displaceable under action of said fluid, the method comprising:
    generating a series of consecutive first oscillating signals and a series of consecutive second oscillating signals whose oscillating frequency depends on displacement of said diaphragm;

calculating a first numerical value which is representative of the oscillating frequency of said consecutive first oscillating signals, and a second numerical value which is representative of the oscillating frequency of said consecutive second oscillating signals;

generating a signal, with a microprocessor, indicative of pressure exerted by said fluid on the diaphragm based on said first and second calculated numerical values;

calculating a difference between two consecutive signals indicative of pressure exerted by said fluid on the diaphragm; and whenever said difference exceeds a predefined second threshold, generating a command signal so as to reduce a time interval during which each numerical value representative of the oscillating frequency of said consecutive first oscillating signals and of said consecutive second oscillating signals is calculated.

11. The method according to claim 10, comprising:
comparing said first and second numerical values; and
generating, whenever a difference between said first and second numerical values exceeds a first predefined threshold, an alarm signal indicative of a fault condition of the pressure transmitter.

12. The method according to claim 11, comprising:
resetting the calculating of said first and second numerical values for a predefined number of times before generating said alarm signal.

13. The method according to claim 10, wherein said first and second numerical values are calculated substantially at a same time.

14. The method according to claim 10, wherein whenever said difference does not exceed the predefined second threshold, generating a command signal so as to extend a time interval during which each numerical value representative of the oscillating frequency of said consecutive first oscillating signals and of said consecutive second oscillating signals is calculated.

15. The method according to claim 10, wherein said calculating comprises:
calculating a first signal and a second signal having time durations whose counted values are indicative of the oscillating frequency of said consecutive first oscillating signals and of said consecutive second oscillating signals, respectively.

16. The method according to claim 10, comprising:
applying a corrective coefficient to said first and second numerical values based on an environmental temperature measured externally to said pressure transmitter.

17. The method according to claim 10, comprising:
calculating a static pressure of the fluid; and
performing a correction using a calculated static pressure value on said signal indicative of pressure exerted by the fluid on the diaphragm.

* * * * *